United States Patent
Farid et al.

(10) Patent No.: US 9,521,608 B2
(45) Date of Patent: Dec. 13, 2016

(54) TECHNIQUES TO CREATE, UPDATE, DISSEMINATE, AND USE DYNAMIC SUBSET BACKHAUL CHANNEL LISTS IN A MESH NETWORK

(71) Applicant: Cisco Technology, Inc., San Jose, CA (US)

(72) Inventors: M. A. Sheik Farid, Tamil Nadu (IN); Hrishikesh Vishwas Kulkarni, Bangalore (IN); Tak Ming Francis Pang, Palo Alto, CA (US); Krishnakumar Ramachandran, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 14/322,373

(22) Filed: Jul. 2, 2014

(65) Prior Publication Data
US 2016/0007273 A1 Jan. 7, 2016

(51) Int. Cl.
*H04W 48/16* (2009.01)
*H04W 76/02* (2009.01)
*H04W 8/00* (2009.01)

(52) U.S. Cl.
CPC .......... *H04W 48/16* (2013.01); *H04W 76/021* (2013.01); *H04W 76/028* (2013.01); *H04W 8/005* (2013.01)

(58) Field of Classification Search
CPC ....... H04W 48/16; H04W 76/02; H04W 88/08
See application file for complete search history.

(56) References Cited

U.S. PATENT DOCUMENTS

| | | | |
|---|---|---|---|
| 6,332,077 B1 | 12/2001 | Wu et al. | |
| 2007/0280155 A1* | 12/2007 | Le | C07D 301/06 370/328 |
| 2008/0075035 A1 | 3/2008 | Eichenberger | |
| 2008/0080414 A1* | 4/2008 | Thubert | H04W 76/022 370/328 |
| 2008/0259788 A1* | 10/2008 | Wang | H04W 40/24 370/221 |
| 2015/0365831 A1* | 12/2015 | Ko | H04L 5/0098 370/329 |

* cited by examiner

*Primary Examiner* — Xavier S. Wong
(74) *Attorney, Agent, or Firm* — Edell, Shapiro & Finnan, LLC

(57) ABSTRACT

A mesh network includes a controller, root access points (APs), and mesh APs assigned to different groups of APs. The controller creates for each group a distinct subset channel list of backhaul channels used by root APs of the group that are connected to the controller. The controller updates, for each group, the subset channel list as root APs assigned to the group connect with and disconnect from the controller. The controller sends, for each group, the subset channel list to the mesh APs assigned to the group that are connected with the controller through respective root APs when the subset channel list is created and updated.

22 Claims, 7 Drawing Sheets

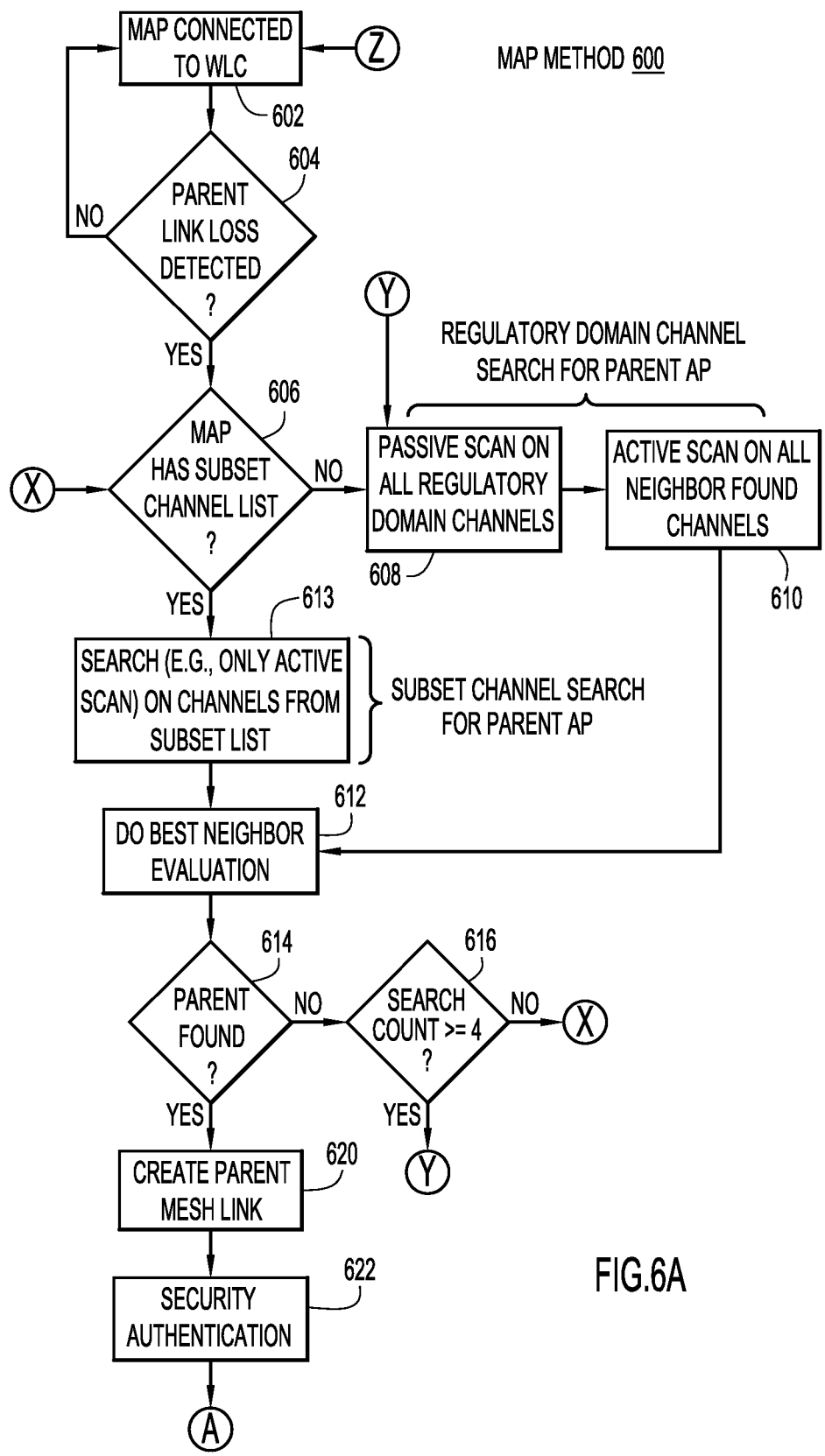

TECHNIQUES TO CREATE, UPDATE, DISSEMINATE, AND USE DYNAMIC SUBSET BACKHAUL CHANNEL LISTS IN A MESH NETWORK

TECHNICAL FIELD

The present disclosure relates to wireless mesh networks.

BACKGROUND

A wireless mesh network includes wireless access points (APs) connected to each other through a hierarchical parent-child network of wireless backhaul links to form a mesh tree. The wireless backhaul links comprise radio frequency (RF) channels (e.g., 5 Gigahertz channels) defined in a regulation or standard. Typically, the standard defines numerous channels, which are referred to as "regulatory domain channels." To form the mesh tree, an AP conventionally searches (e.g., passively and actively scans) across a full set of regulatory domain channels to find a parent AP to which the AP can connect to establish a backhaul link. The search can take a relatively long time to complete because of the large number of regulatory domain channels that have to be searched. The relatively long search time disrupts data flow to and from end clients connected with the searching AP, such as IEEE 802.11 wireless clients. Often, many of the regulatory domain channels are not in use in the vicinity of the searching AP. Thus, the AP wastes valuable time searching on empty channels for potential parents.

BRIEF DESCRIPTION OF THE DRAWINGS

FIGS. 6A and 6B illustrate a flowchart for a method expanding on the method of FIG. 5 performed in the MAP, according to an example embodiment.

DESCRIPTION OF EXAMPLE EMBODIMENTS

Overview

Techniques presented herein relate to a mesh network. The mesh network includes a network controller to control access points (APs) including mesh access points (MAPs) and one or more root APs (RAPs) that are collectively assigned to different AP groups (each identified by, e.g., a Bridge Group Name (BGN)). Each RAP has a wired connection to the network controller and forms a root of a tree in which the MAPs of a given group are linked back to the RAP of that group through parent-child connections over wireless backhaul channels. According to one technique the network controller creates, updates, and disseminates to MAPs dynamic subset channel lists that identify, for each group, active backhaul channels for use by the MAPs in the corresponding group. Initially, the network controller creates, for each group, a distinct subset channel list of backhaul channels used by RAPs of the group that are connected to the network controller. Then, the network controller updates, for each group, the subset channel list as RAPs assigned to the group connect with and disconnect from the network controller. The network controller sends, for each group, the subset channel list to the MAPs assigned to the group that are connected with the network controller through respective RAPs when the subset channel list is created and updated, and when the network controller detects that MAPs have executed roam events so as to connect with new parent APs.

According to another technique, a MAP uses a disseminated active channel list instead of pre-assigned regulatory domain channel list in search of a parent AP. Initially, the MAP (of a given group) connects with the network controller through a wireless backhaul channel connection to an initial parent AP. Once connected with the network controller, the MAP receives the subset channel list for the given group from the network controller through the initial parent AP. If the MAP loses the backhaul channel connection to the initial parent AP, the MAP searches the backhaul channels on the subset channel list for a new parent AP, instead of searching all regulatory domain backhaul channels. The MAP then connects with a parent AP found based on the search of the subset channel list.

Example Embodiments

Mesh Network

Figure 1:
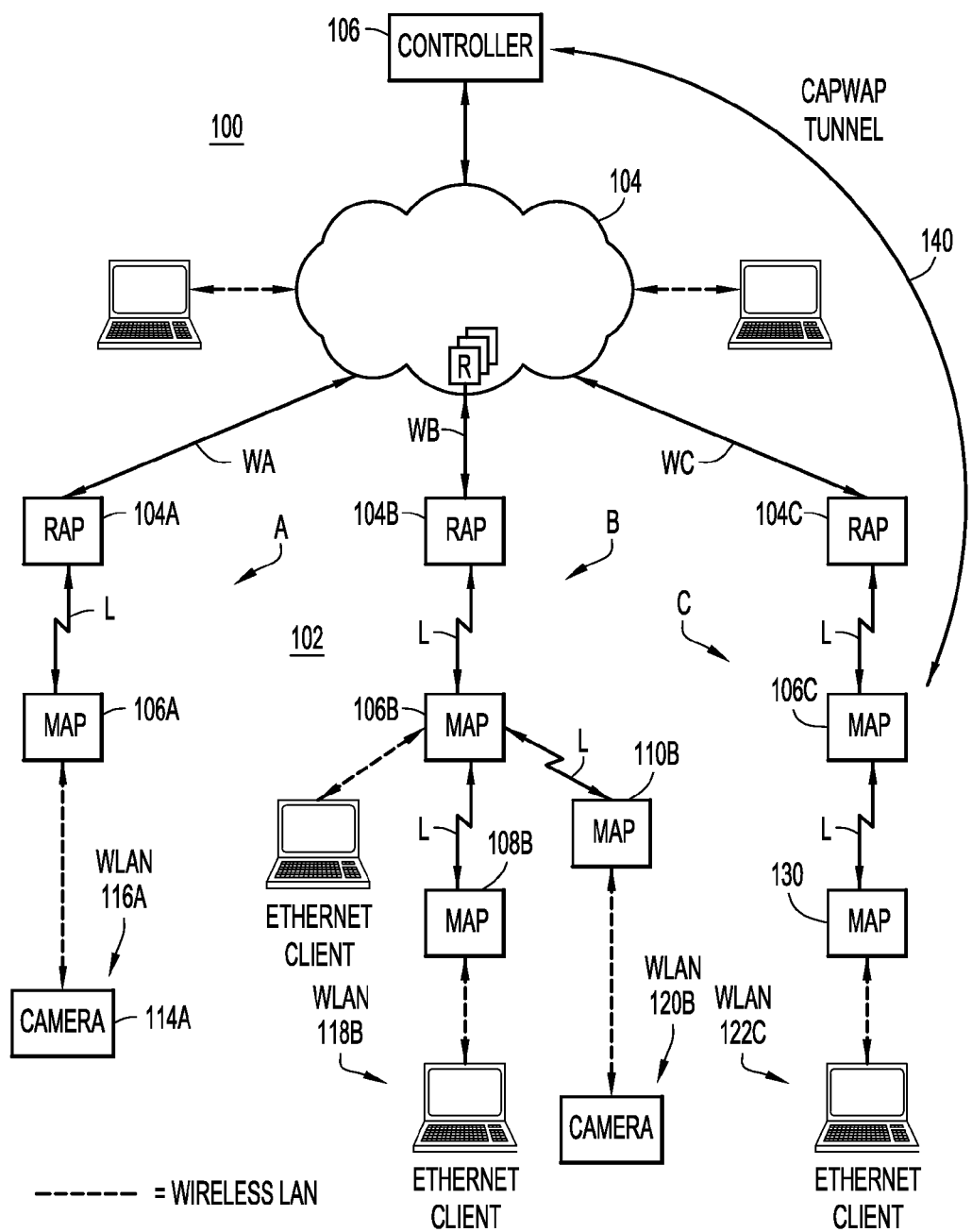
FIG. 1 is a block diagram of an example wireless mesh network in which techniques presented herein may be implemented.

Referring first to FIG. 1, there is shown a block diagram of an example wireless mesh network 100, including: a plurality 102 of wireless access points (APs) (designated as either "MAP" or "RAP" in FIG. 1) wirelessly coupled by a wireless network of backhaul links L between the APs: a wired network 104, coupled to the APs, including one or more local area networks (LANs) and one or more wide area networks (WANs), such as the Internet; and a network controller 106 coupled to the wired network 104 to control the mesh network 100, and particularly, the APs. Wired network 104 may include one or more routers and/or switches R to route traffic to and from the wired network. The wireless network of backhaul links L (referred to herein as wireless "backhaul links" or wireless "backhaul channels") of the APs form a hierarchical spanning-tree including multiple main tree branches A, B, and C. Each of main tree branches A, B, and C may also be referred to as a tree of mesh network 100 or a network mesh tree. Each AP is configured and operates as a either a root AP (RAP) or a mesh AP (MAP) depending on its position, connections, and function in the respective one of branches A-C of mesh network 100, as will be now be described.

Each of branches A, B, and C includes a respective RAP 104A, 104B, and 104C that forms a root of the respective branch and has a respective one of wired connections WA, WB, and WC to wired network 104, and to one or more of routers/switches R in the wired network. Each of RAPS 104A-C has one or more respective descendent APs (which are the MAPs) that communicate with each other and back to the RAP through backhaul links L (depicted as lightning bolts in FIG. 1), such that the RAP and the respective MAPs collectively form a respective one of branches A-C of the spanning tree. For example, branch A includes RAP 104A and a descendent MAP 106A that communicate with each other through backhaul link L. Communications between APs over backhaul links L may operate in accordance with IEEE 802.11g/a/n/ac. In the ensuing description, "AP" may refer generally to either an RAP or an MAP.

As seen in FIG. 1, the APs in each of branches A-C establish hierarchical, i.e., parent-child or ascendant-descendant, relationships with each other over the respective backhaul links L. In branch A, root AP 104A is a parent AP of mesh AP 106A, and mesh AP 106A is considered a child AP of parent AP 104A. A child AP may have only one parent AP, but each child AP may itself be a parent AP of multiple children APs. For example, in branch B, root AP 104B is a parent of mesh AP 106B, which is itself a parent of two child APs, namely, mesh APs 108B and 110B. A backhaul link that serves a child AP or a parent AP is referred to as a downlink or an uplink, respectively.

The APs of mesh network 100 are divided among (i.e., assigned to) multiple different groups of APs referred to as Bridge Groups, where each Bridge Group is identified by a corresponding Bridge Group Name (BGN). For example, the APs of branches A, B, and C of mesh network 100 may be part of first, second, and third BGNs A, B, and C, respectively (i.e., each branch represents its own BGN). Once assigned to BGNs, the APs of mesh network 100 are constrained to form parent-child relationships only with other APs assigned to the same BGN. In other words, the BGN represents a mesh tree identifier because only APs of the same BGN may connect with each other to form a mesh tree. The BGN is similar to a Service Set Identifier (SSID) to identify a service domain in an IEEE 802.11 standard network. In the example of FIG. 1, MAP 106A may form a parent-child relationship only with RAP 104A because the MAP and RAP are part of the same BGN (BGN A). In addition to being assigned to different BGNs, the APs in a given BGN may be further divided among and identified with (i.e., assigned to) different geographical regions. For example, a BGN including 4 RAPs and 8 MAPs may be divided across four geographical regions, where each region includes a different one of the 4 RAPs and different pairs of the 8 MAPs. Thus, a given AP in mesh network 100 may be mapped to/identified by a corresponding BGN and a corresponding geographical region. A given region within a BGN is identified as a "BGN/region."

The topology of mesh network 100 depicted in FIG. 1 represents a non-limiting example; other topologies are possible. For example, a mesh network may include children APs each of which has multiple parent APs. In this case, multiple logic spanning trees can be created on top of a multi-parent mesh network. The techniques presented herein apply equally well to all such topology variations.

Each AP in each of branches A-C of mesh network 100 provides clients that are served by the AP with access to mesh network 100. To this end, each AP may communicate wirelessly with clients in one or more wireless local area networks (WLANs) served by that AP. APs may provide access to wireless clients over wireless access links in accordance with any of the IEEE 802.11 protocols, for example. In branch A, mesh AP 106A may communicate with a wireless client 114A in a WLAN 116A served by the AP. Similarly, in branch B, mesh APs 108B and 110B may communicate with wireless clients in respective WLANs 118B and 120B, while in branch C, mesh AP 130C may communicate with wireless clients in a WLAN 122C. Each AP may also provide client access to mesh network 100 through, e.g., wired Ethernet.

Network controller 106 normally operates as a central controller of mesh network 100 to (i) maintain the topology of the mesh network, (ii) control the functionality of the APs, and (iii) route data traffic (referred to as "traffic") associated with each AP to and from wired network 104. To route traffic, network controller 106 serves as a focal point for each AP through which traffic to and from the AP is routed. Such traffic includes data packets from a wireless client served by the AP and destined for the Internet, or data packets from the Internet destined for the client. A Control and Provisioning of Wireless Access Points (CAPWAP) protocol, described in large part in RFC 5415, may be used between each of the APs in mesh network 100 and network controller 106 to enable the network controller to perform the aforementioned control and AP traffic routing functions with respect to each AP. It is to be understood that other similar/suitable wireless network control protocols are possible, as would be appreciated by those of ordinary skill in the relevant arts having access to the description herein.

At a high-level, under the CAPWAP Protocol, each AP in mesh network 100 discovers a network controller, e.g., network controller 106, over the network of backhaul links L. Then, the AP forms an individual, secure CAPWAP tunnel between itself and the discovered network controller 106 over the backhaul links L. Network controller 106 and the AP exchange CAPWAP management messages with each other through the CAPWAP tunnel. Also, traffic associated with the AP is routed to and from wired network 104 via a CAPWAP tunnel. In FIG. 1, an example CAPWAP tunnel 140 is formed between network controller 106 and a MAP 106C connected to branch C of the spanning-tree. It is to be understood that the CAPWAP tunnel is shown by way of example only and is representative of any suitable encapsulating protocol tunnel that may be used herein.

Operating the CAPWAP Protocol across APs in the mesh network presumes that the APs have been organized into a hierarchical topology at least at some basic level. The APs may adaptively form this topology, e.g., the spanning-tree of mesh network 100 depicted in FIG. 1, through a tree-based routing process that builds a tree topology based on wireless backhaul links between the APs. An example tree-based routing process that may be used to form mesh network 100 is the Adaptive Wireless Path Protocol (AWPP) by Cisco Systems, Inc. Using such a process, the tree topology may be built as a RAP and MAPs discover one another, and each MAP performs a search for a parent AP among potential parent APs that provides a least-cost path (i.e., best route) to the RAP. In an example where each AP advertises to its neighbor APs a path cost back to the RAP, the neighbor APs can find/select a parent AP based on a least one of the advertised path costs.

In the above-mentioned search for a parent AP, each MAP searches wireless backhaul channels for neighbor APs in the vicinity of the MAP for potential parents. A conventional search involves a search, including both passive and active scans, across a set of wireless backhaul channels defined in a regulation or operating standard to identify neighbor channels of neighbor APs. The channels defined in the regulation are referred to herein as "regulatory domain channels." A total number of regulatory domain channels may be relatively high (e.g., 20-30 channels), and the MAP typically dwells for several seconds on each channel during the search. Given the relatively high number of regulatory domain channels and the several second dwell time per channel, a scan of all of the regulatory domain channels (i.e., a full regulatory domain channel scan) may take a relatively long time to complete. Moreover, many of the regulatory domain channels may not be in use in the vicinity of the MAP and, therefore, a dwell by the MAP on any such unused channel is inefficient.

According to techniques presented herein, network controller 106 automatically determines different subsets of regulatory domain channels for MAPs in different BGNs and geographical locations/regions and disseminates the identities of the channels in each subset of channels (as a subset channel list) to the MAPs associated with the BGNs and locations. Then, each MAP searches only the channels identified on the disseminated subset channel list (received by the MAP) for a parent AP instead of a full set of regulatory domain channels identified on a regulatory domain channel list. As a result, the subset channel lists substantially reduce the number of wireless backhaul channels that MAPs searches across for a parent AP and, in turn, substantially reduce the total time taken to complete the scan. Also, active scans on the subset of channels are favored over passive scans to further increase search efficiency. The techniques are described in detail in connection with FIGS. 5 and 6 below.

MAP/RAP Architecture

Figure 2:
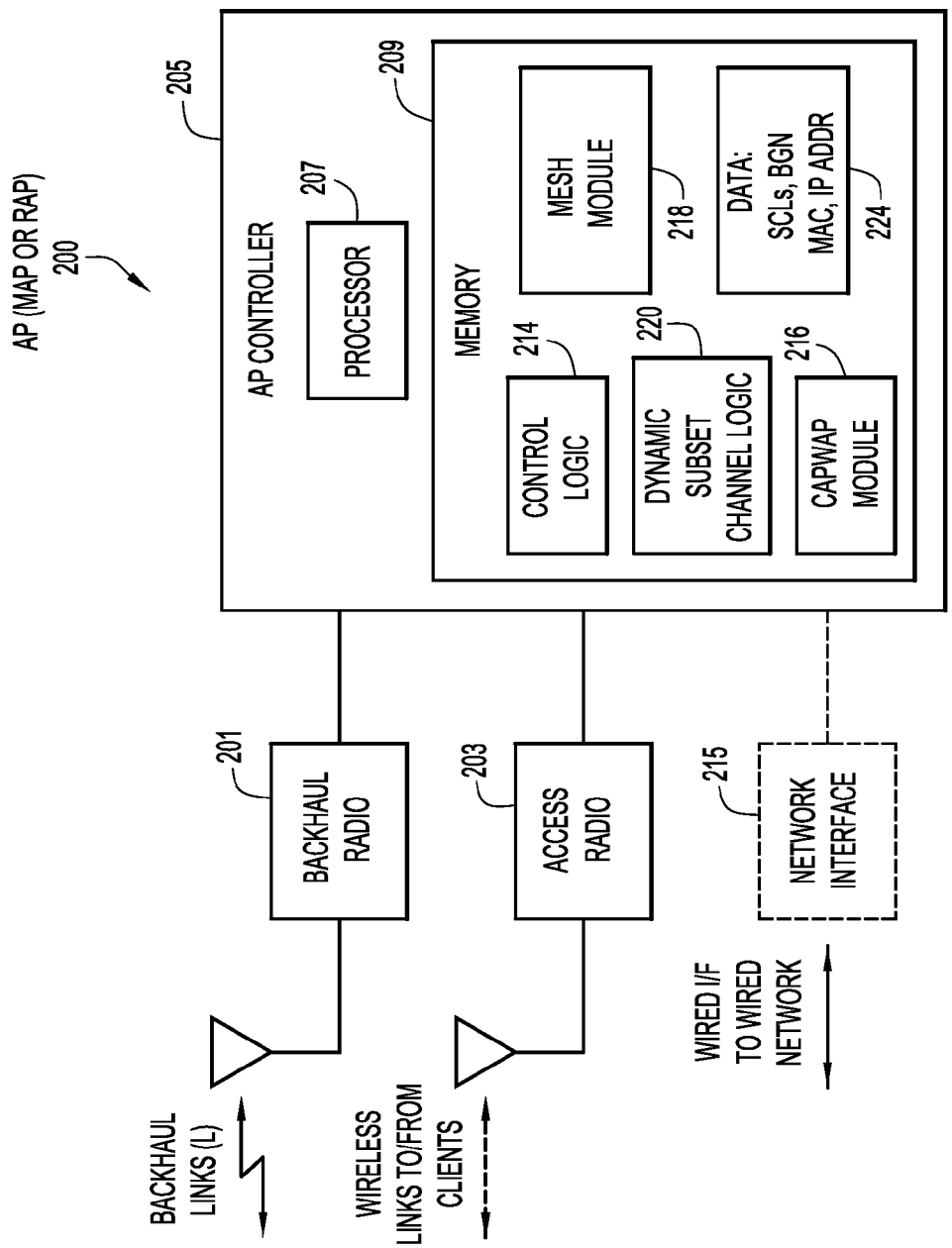
FIG. 2 is a block diagram of a wireless access point (AP) of the mesh network of FIG. 1, according to an example embodiment, which AP may be a root AP (RAP) or a mesh AP (MAP) configured to perform operations to implement techniques presented herein.

With reference to FIG. 2, there is shown a block diagram of an example AP 200 of mesh network 100 configured to perform operations according to techniques provided herein. AP 200 may be configured as a RAP or a MAP, such as RAP 104A or MAP 106A, respectively. AP 200 includes a wireless backhaul radio 201 (also referred to a transmitter/receiver or "transceiver" 201) to support wireless backhaul links, a wireless access radio 203 to support access for wireless clients served by the AP, and an AP controller 205 to which the backhaul and access radios are coupled. In an embodiment, radios 201 and 203 are integrated into a single radio. Backhaul radio 201 may operate according to IEEE 802.11a in the approximately 5 Gigahertz band, and access radio 203 may operative according to IEEE 802.11b/g in the approximately 2.4 GHz band. Each radio includes a respective set of one or more antennas. AP 200 may include a wired network interface 215 that enables the AP to connect to wired network 104 and thereby operate as a root AP. Alternatively, AP 200 may operate as a mesh AP.

AP controller 205 includes a processor 207 and memory 209. Processor 207 is a microcontroller or microprocessor, for example, configured to execute software instructions stored in memory 209. Memory 209 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 209 may comprise one or more computer readable storage media (e.g., a memory device) encoded with software comprising computer executable instructions and when the software is executed (by processor 207) it is operable to perform the operations described herein. For example, memory 209 stores or is encoded with instructions for:

a. Control logic 214 to perform overall control of AP 200. Control logic 214 may include a CAPWAP module 216 to implement the CAPWAP Protocol, and a Mesh module 218 to implement AWPP and related operations; and b. Dynamic Subset Channel logic 220 to operate the AP in accordance with techniques described herein directed to managing and using dynamic subset channel lists to perform parent AP searches;

Logic modules 216, 218, and 220 are depicted as separate and distinct from Control logic 214 in FIG. 2 for purposes of convenience; however, it is to be understood that portions of each of logic modules 216, 218, and 220 are, in practice, incorporated into Control logic 214. Moreover, logic modules 214-220 perform RAP operations when AP 200 operates as a RAP and MAP operations when AP 200 operates as a mesh AP.

Memory 209 also stores information/data 224 used by logic 216-220, including, but not limited to, subset channel lists, regulatory domain channel lists, BGN and region membership information (e.g., assignment information), Media Access Control (MAC) addresses, Internet Protocol (IP) addresses, CAPWAP and AWPP state information, and so on.

CAPWAP module 216 implements a CAPWAP state machine (SM) and associated protocol timers that have an instance in the AP and a corresponding or mirror instance in network controller 106. In accordance with technique presented herein, if a MAP loses its mesh link connection to a parent AP, the CAPWAP SM maintains its current state for a predetermined period of time and continues to operate its normal protocol timers, while the MAP searches for a new parent AP. Mesh module 218 implements an AWPP SM and associated protocol timers to build and maintain links of a mesh network through backhaul links (e.g., to parent and child APs). Mesh module 218 and CAPWAP module 216 exchange respective state information reflective of link connectivity with a network controller. Mesh module 218 handles channel searches (active and passive channel scans), discovery of a parent AP, calculates and updates backhaul metrics related to path cost, and establishes an association with an optimal parent AP, i.e., a parent advertising a least-cost path. Mesh module 218 may include the following states: boot, passive scan, active scan, attempt connection, link authentication, and connected states. Generally, in a passive scan, an AP listens for (mesh) beacons or broadcast probe responses, but does not transmit. In an active scan, the AP transmits/sends requests, such as (mesh) probe/request messages, to solicit for responses used to locate other APs with which to connect. Each state implements a function. After an AP is powered-on, an example mesh state machine sequence is as follows:

a. Upon boot-up, the AP determines whether it is an RAP, i.e., if it has a wired connection to a wired network. If the AP is an RAP, then the AP connects to the network controller through a wired connection and enters into a connected state;

b. If the AP is not an RAP, i.e., it is an MAP, then the AP scans all regulatory domain backhaul links/channels for mesh beacons (passive scan state), if the AP does not have a subset channel list (see operation (f) below);

c. The AP actively solicits neighboring APs (active scan state);

d. The AP selects the best parent from the available parent APs based on advertised path costs from mesh beacons or received responses (active scan and attempt connection states);

e. The AP authenticates to the mesh network (Authenticate state); and f. Through its parent, after connecting with the network controller, the AP then enters the connected state and is willing to respond to solicitations. Also, in accordance with techniques presented herein, the AP receives a subset channel list from the network controller and performs subsequent channel searches based on the subset channel list instead of a regulatory domain channel list if the AP becomes disconnected from a parent AP, as described below.

Further operations of mesh module 218 and modifications to the AWPP protocol related to the techniques presented herein will be described in connection with FIGS. 5 and 6, below.

Network Controller

Figure 3:
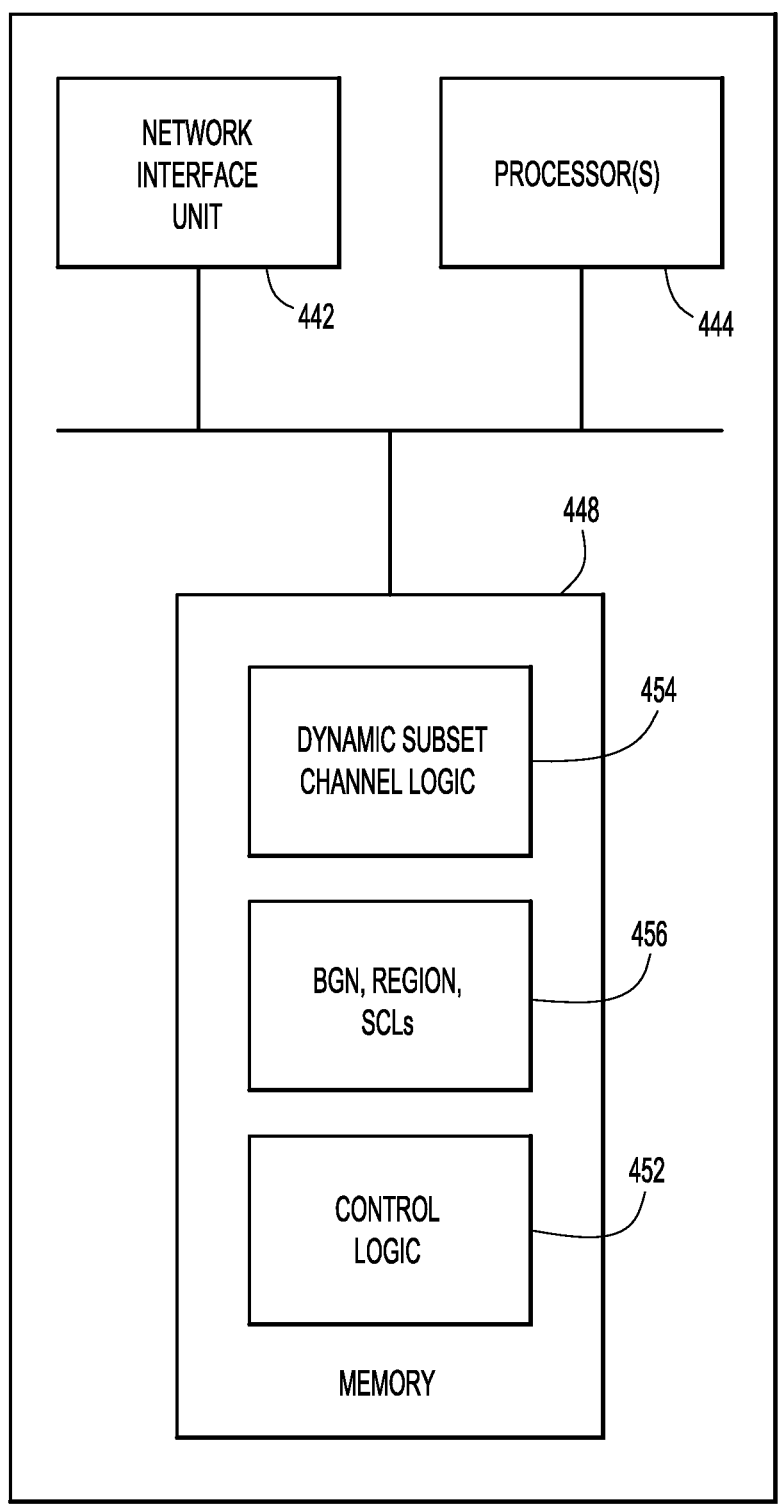
FIG. 3 is a block diagram of a network controller of the mesh network of FIG. 1, according to an example embodiment.

Reference is now made to FIG. 3, which shows an example block diagram of network controller 106 configured to perform the operations described herein. Network controller 106 includes a network interface (I/F) unit 442, a processor 444, and a memory 448. The network I/F unit 442 is, for example, an Ethernet card device that allows network controller 106 to communicate over network 104. Network I/F unit 442 may also include wireless connection capability. Processor 444 is a microcontroller or microprocessor, for example, configured to execute software instructions stored in the memory 448.

Memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 448 may comprise one or more computer readable storage media (e.g., a memory device) encoded with software comprising computer executable instructions and when the software is executed (by processor 444) it is operable to perform the operations described herein. For example, memory 448 stores or is encoded with instructions for Control logic 452 to perform overall control of network controller 106 and APs in network 100. Control logic 452 includes CAPWAP logic similar to that of CAPWAP module 216 in the APs to implement and manage the CAPWAP Protocol from the perspective of network controller 106. Memory 448 also stores instructions for Dynamic Subset Channel logic 454 to perform techniques directed to creating, updating, and disseminating subset channel lists in network 100. In addition, memory 448 includes a database 456 that stores information indicating assignments of APs to BGNs and regions within BGNs, subset channel lists for each BGN and associated regions, backhaul channels used by MAPs and RAPS, AP identifiers/addresses, CAPWAP protocol information, and so on.

Figure 4:
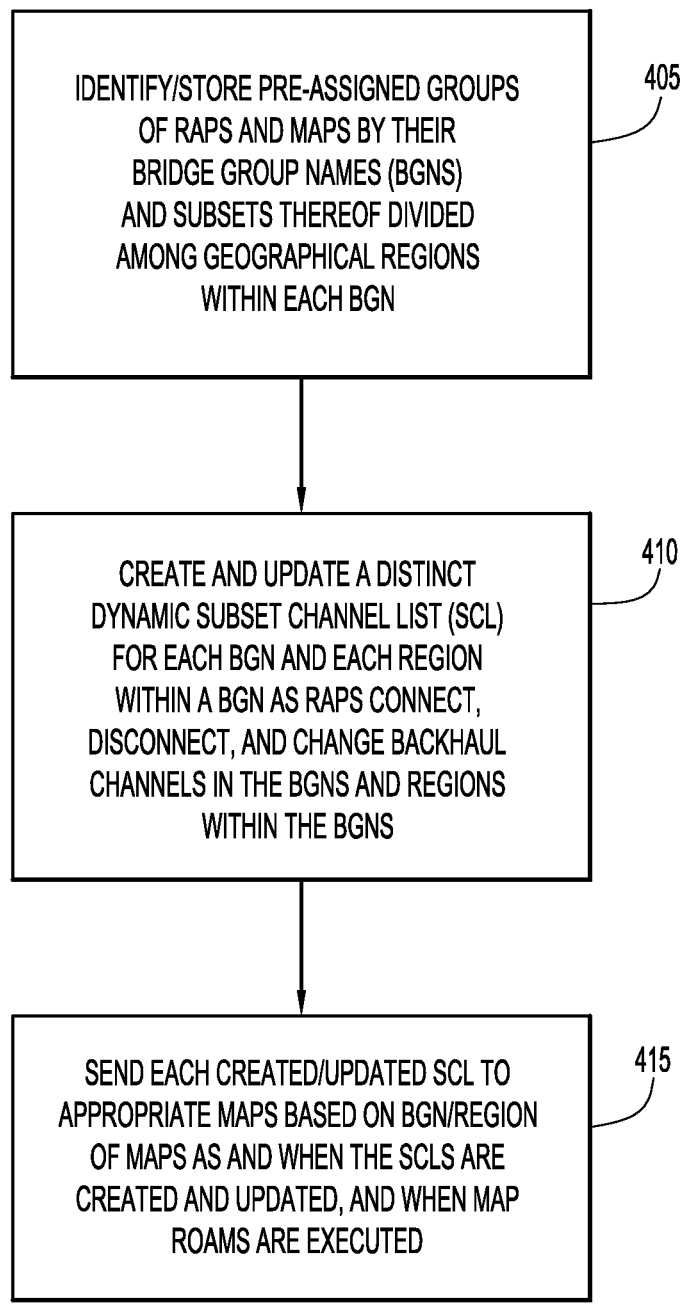
FIG. 4 is a flowchart of a method of creating, updating, and disseminating dynamic subset channel lists in the mesh network of FIG. 1 that is performed in the network controller, according to an example embodiment.

With reference to FIG. 4, there is shown a flowchart of an example method 400 of performing dynamic subset channel management that is performed in network controller 106, including creating, updating, and disseminating subset channel lists (SCLs).

At 405, network controller 106 stores a priori information relating to mesh network 100. The a priori information includes but is not limited to assignments of groups of RAPs and MAPs (by RAP identifiers and MAP identifiers) to different BGNs. The RAPs and MAPs assigned to a given BGN may be further grouped according to geographical region within the BGN. The a priori information maps RAPs and MAPs to corresponding BGNs and regions. The a priori information may also identify one or more pre-assigned backhaul channels that each RAP is to use during network operation, although a given RAP may switch to other backhaul channels during operation.

At 410, for each BGN (and region, if applicable), network controller 106 creates a distinct subset channel list of backhaul channels actually used by RAPs of the BGN/region that are connected to the network controller. To do this, network controller 106 learns an identity of the connected RAP and uses the identity to access the corresponding BGN/region and pre-assigned backhaul channels in the stored a priori information. Then, network controller 106 populates the subset channel list for the BGN/region with accessed identifiers of the pre-assigned backhaul channels. Thus, a subset channel list is a list of channel identifiers (e.g., channel 1, channel 41, and so on) that corresponding to backhaul channel frequencies used by RAPs in a given BGN and region that are connected to network controller 106.

Also at 410, for each BGN/region, network controller 106 dynamically updates the subset channel list (hence the name "dynamic subset channel list" used herein) as RAPs assigned to the BGN/region connect to and disconnect from the network controller, and switch from their pre-assigned backhaul channels to new backhaul channels. For example, network controller 106 adds and removes backhaul channels (i.e., backhaul channel identifiers) to and from the appropriate subset channel list when RAPs assigned to the corresponding BGN/region that use those channels connect to and disconnect from network controller 106, respectively.

Each channel identified on each subset channel list is associated with a list of locations or coordinates of the corresponding RAPs on that channel. Network controller 106 performs a coverage are estimation based on AP location, antenna pattern, and RF signal strength. The coverage area will increase in size as more MAPs join a given mesh tree and become secondary potential parent APs. When a new MAP joins the mesh network within the coverage area of a region, network controller 106 sends an appropriate subset channel list for the region to the new MAP.

At 415, for each BGN/region, network controller 106 sends the subset channel list only to the MAPs assigned to that BGN/region that are connected with the network controller, under certain conditions. Network controller 106 sends the subset channel list to the appropriate MAPs when it is first created, and each time the subset channel list is updated. In addition, network controller 106 detects if any MAP assigned to the BGN/region that was connected to the network controller has executed a roam from a current parent AP to a new parent AP within the BGN/region. If network controller 106 detects that a roam has been executed (e.g., a new parent AP to which the MAP has roamed reports that event to the network controller), the network controller sends the subset channel list to the MAP that has executed the roam. Also, network controller 106 records for each MAP the RAPS in the vicinity of the MAP; network controller 106 will not notify the MAP of a subset channel list change (update) if a RAP added to or removed from the subset channel list is not within the vicinity of the MAP in order to reduce unnecessary communication. Operation 415 disseminates the dynamic subset channel lists to the appropriate MAPs throughout mesh network 100 in a timely fashion so that the MAPs have up to date channel lists to search for parent APs as and when necessary, as described below in connection with FIGS. 5 and 6. A "channel search" or just "search" as used herein can be a passive scan, an active scan, or a combination of both a passive and active scan.

Figure 5:
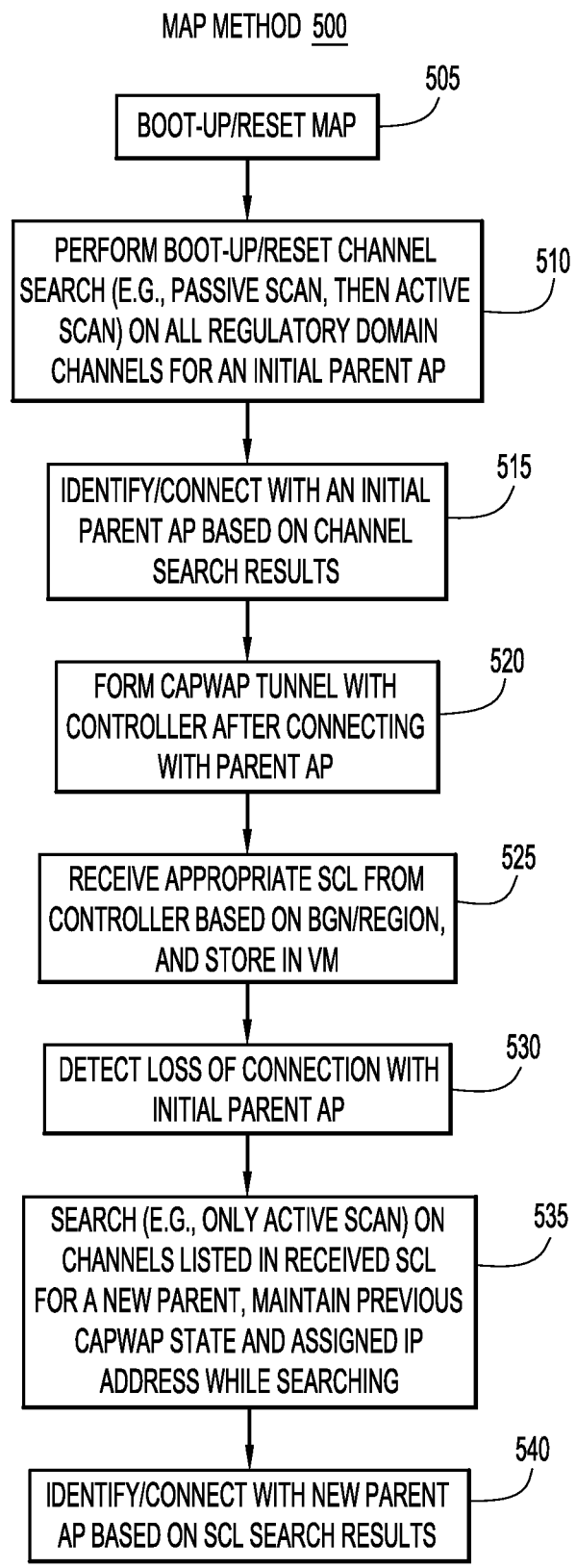
FIG. 5 is a flowchart of a method of using a subset channel list disseminated in the method of FIG. 4 that is performed in a MAP, according to an example embodiment.

FIG. 5 is a flowchart of an example method 500 of using a dynamic subset channel list disseminated in method 400 that is performed in a MAP.

At 505, the MAP executes a boot-up or a reset procedure as a result of any number of reset events, e.g., power-on, failure recovery, protocol (e.g., CAPWAP and/or AWPP) timeout, and so on.

At 510, responsive to the boot-up or reset procedure, the MAP performs a channel search on all regulatory domain channels for an initial parent AP. The regulatory domain channel search may include (i) passive scan on each of the regulatory domain channels to identify neighbor channels associated with neighbor APs, and (ii) an active scan on each identified neighbor channel, as will be described more fully below in connection with FIGS. 6A and 6B.

At 515, the MAP identifies and connects with an initial parent AP in the same BGN/region as the MAP based on results of the full regulatory domain channel search.

At 520, the MAP receives an IP address from the native wired network through parent APs of the MAP and uses the received IP address to establish a CAPWAP tunnel with network controller 106.

At 525, the MAP receives a subset channel list from network controller 106 for the BGN/region to which the MAP is assigned. The MAP may store the subset channel list in a volatile memory (VM) of the MAP so that the subset channel list does not persist through a subsequent boot-up or reset event, after which the MAP will be forced to perform a full regulatory domain channel search.

At 530, the MAP loses a connection with the initial parent AP and detects the loss of connection. The connection may be lost when the MAP initiates a roam from the initial parent to a new parent or if the initial parent AP is experiencing a failure, for example. Loss of parent AP could also be caused by a high RF interference between parent and child APs, in which case the child AP may experience a loss of "keep alive" response messages from the parent AP. When this happens, the child AP declares "loss of parent" after a defined parent loss timer expiry and then searches for another parent AP that has improved signaling with the child AP.

At 535, responsive to the detected loss of connection from the initial parent AP, the MAP searches only the backhaul channels identified in the received subset channel list, instead of all of the regulatory domain channels, for a new parent AP. In an embodiment, the subset channel list channel search skips passive scans on the channels (as used in the regulatory domain channel search) and goes directly to active scans on the channels, as will be described below in connection with FIGS. 6A and 6B. The MAP maintains previous CAPWAP connection states during the subset channel list scan. Operation 535 saves time because passive scans are avoided and active scans are performed only on the limited number of subset channels.

At 540, the MAP identifies and connects with a new parent AP based on results of the subset channel list search. Then the MAP re-instantiates the CAPWAP connection with network controller 106 through the new parent AP. Because of the time saved at 535, CAPWAP expiry is avoided so that the MAP is able to re-instantiate/maintain the CAPWAP connection. Thus, the MAP finds its next potential parent AP based on the subset channel search while retaining a previously assigned IP address and CAPWAP connectivity.

Each time before the MAP attempts to roam to a better/new parent AP, the MAP performs a subset channel list search for a next parent. If the MAP experiences a boot-up or reset event, the subset channel list is extinguished and the MAP is forced to perform a full regulatory domain channel search for a new parent.

Figure 6B:
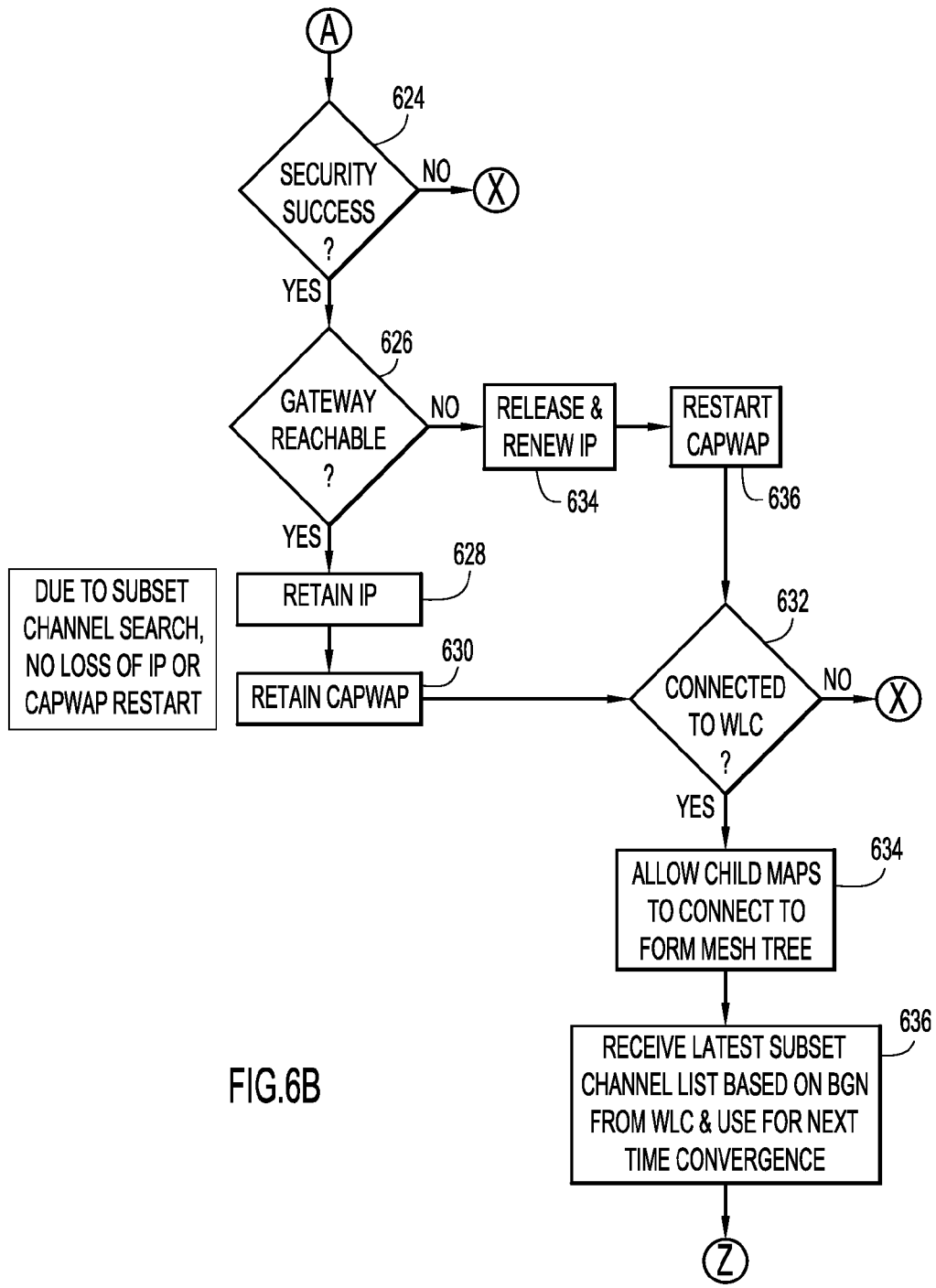

With reference to FIGS. 6A and 6B, there is shown a flowchart of a method 600 expanding on method 500 performed in the MAP. In FIGS. 6A and 6B, network controller 106 is referred to as a wireless LAN controller (WLC).

At 602, the MAP forms a connection (i.e., a "parent link") with a parent AP and connects with network controller 106 over the parent link.

At 604, the MAP determines whether it has lost the parent link. If it is determined that the parent link is not lost, flow returns to 602. Otherwise, flow proceeds to 606.

At 606, the MAP determines whether it has received a subset channel list. If it is determined that the MAP has not received the subset channel list, flow proceeds to 608 and 610, wherein the MAP searches all of the regulatory domain channels (downlink wireless backhaul channels) that were pre-allocated in the MAP for a new parent AP, as described below.

At 608, the MAP performs a passive scan of the regulatory domain channels in search of neighbor APs in the vicinity of the MAP that represent potential new parent APs for the MAP. In the passive scan, the MAP (radio) dwells on each channel to listen for beacon frames ("mesh beacons") or broadcast probe messages sent from APs in the vicinity of the MAP. APs periodically transmit beacon frames on their respective backhaul channels, and the MAP attempts to detect these beacon frames in operation 608. In an example, the MAP dwells for a certain amount of time (e.g., 2 seconds) on each of 21 regulatory domain channels in operation 608. The MAP flags each channel on which beacon frames were received and identifies the AP associated with that channel as a neighbor AP that may become a new parent AP. Typically, the number of flagged channels is much less than the number of regulatory domain channels. Note that APs broadcast the BGNs to which they belong in their respective mesh beacons and in mesh handshaking messages (e.g., messages described below).

At 610, the MAP performs an active scan on each of the flagged (neighbor) channels. An active scan is sometimes referred to as a "seek operation." To perform the active scan, the MAP broadcasts Neighbor_Request messages on all of the flagged channels associated with neighbor APs and then waits for responses from the neighbor APs. Each neighbor AP that receives the Neighbor_Request message sends a unicast Neighbor_Response message back to the MAP. The Neighbor_Response message may carry certain information from which the MAP may determine a best neighbor AP with which to connect as a new parent AP. In an example, the active scan performed by the MAP may take several seconds per channel.

In the example of FIGS. 6A and 6B, operations 608 (passive scan) and 610 (active scan) are collectively referred to herein as a "search on all of the regulatory domain channels" for a parent AP, which includes (i) a passive scan on all of the regulatory domain channels to identify neighbor channels, and (ii) an active scan (seek) on the identified neighbor channels. Other search embodiments are possible. Flow proceeds from 610 to 612.

Returning to 606, if it is determined that the MAP has received a subset channel list, flow proceeds to 613.

At 613, the MAP performs a search on channels identified in the subset channel list for a parent AP. To do this, in one embodiment, the MAP skips passive scans on the channels of the subset channel list and goes directly to active scans on these channels. The active scan on each of the subset channel list channels is performed as described above with respect to operation 610, except that only the subset channel list channels are actively scanned. Flow proceeds from 613 to 612.

At 612, the MAP evaluates the neighbor APs identified at either 610 or 613 for suitability as the new parent AP. To do this, the MAP determines which of the neighbor APs provides a best route to a RAP (and thus will serve as a next parent AP to the MAP). The MAP determines the best route based on signal-to-noise ratios (SNRs) and hop counts associated with each of the neighbor APs. The MAP measures SNRs based on signals received from the neighbor APs. The hop count is a number of hops (i.e., links) from the neighbor AP to a RAP, and may be broadcasted by the neighbor AP. Neighbor APs associated with higher SNRs and lower hop counts are favored for a best route over neighbor APs associated with lower SNRs and higher hop counts.

At 614, the MAP attempts to select a new parent AP (i.e., "parent found") among the neighbor APs evaluated at 612. In other words, the MAP attempts to select the neighbor AP that provides a best route to a RAP. In some circumstances, the MAP may be unable to select a new parent AP based on results of the evaluation from 612 because the results are not definitive. In the case where a new parent cannot be selected, i.e., a parent is not found, flow proceeds to 616.

At 616, the MAP determines a number of times the MAP has failed to select a new parent based on a search of the subset channel list. If the number of times is less than a threshold number (e.g., 4), flow returns to 606 and the search based on the subset channel list at 613 repeats. If the number of times is greater than or equal to the threshold number, then flow proceeds to 608 and the MAP performs a full regulatory domain channel search at 608 and 610. The count test performed at 616 ensures that the MAP does not get caught in an endless loop of searching only the subset channel list for a new parent AP if the MAP has already done so the threshold number of times.

Returning to 614, if the MAP is able to select a new parent AP, flow proceeds to 620.

At 620, the MAP creates a mesh link with the new parent AP selected at 614.

At 622, the MAP and new parent AP initiate security authentication of the MAP.

If security authentication is successful, 624 routes flow to 626. Otherwise, 624 routes flow back to 606.

At 626, the MAP determines whether the MAP is able to reach a Gateway (e.g., router R). If it is determined that the Gateway is reachable, flow proceeds to 628.

Assuming the MAP was initially connected to network controller 106 at 602, and the MAP was able to use the subset channel list search (i.e., the active scan) at 613 instead of a longer regulatory domain channel search at 608 and 610, then the MAP is able to retain its previously assigned IP address at 628 and retain/maintain information related to its previously established CAPWAP connection with network controller 106 at 630. Flow proceeds from 630 to 632.

Returning to 626, if it is determined that Gateway is not reachable, flow proceeds to 634.

At 634, the MAP releases its previously assigned IP address and is assigned a new IP address.

At 636, the MAP restarts CAPWAP connectivity, and flow proceeds to 632.

At 632, the MAP determines if it is connected with network controller 106. If it is not connected, flow proceeds to 606. If it is connected, flow proceeds to 634.

At 634, the MAP allows other child MAPs to form a mesh tree using the MAP as a parent AP. Also, the MAP reports scanning results (MAC address, BGN, channel information of all potential parents) from the MAP scanning (at regulatory domain search 608 and 610, and 613) to network controller 106, which uses the results to refine and form vicinity metrics.

At 636, the MAP receives a latest subset channel list based on its BGN from network controller 106, and flow returns to 602. The MAP uses the latest subset channel list for the next time convergence, i.e., search for a parent AP in the event that the mesh AP loses its new parent AP connection.

According to techniques presented herein, a network controller generates/selects a subset channel list based on a BGN, which includes X number of RAPs with Y number of channels. The network controller pushes the Y channels to the MAPs that fall within the BGN, where the number Y is comparatively less than a total number of regulatory domain based channels (e.g., typically one quarter of the total number of domain based channels). The MAPs use the subset of channels for future convergence (search for a parent AP after a parent disconnect event) using only active scans without passive scans. In other words, the regulatory domain channel search uses both passive scan and active scan operations across channels while the subset channel list channel search may use only active scan operations to improve search efficiency.

There are numerous advantages of these techniques, including: dynamic updating of subset channel list from the network controller based on BGN as and when MAPs roam across RAPs; faster and guaranteed less convergence time for a MAP to find its backhaul parent AP after losing its old parent AP due to high RF interference or environmental disruptions in 5 GHz channels in customer deployments; negligible data disruptions for 802.11 end clients during a MAP roam; and avoidance of a collapse of an entire mesh tree (From Hop-1 to Hop-8) when a Hop-1 MAP roams, thus the mesh tree is maintained with minimal disruption.

In summary, in one form, a method is provided comprising at controller of a mesh network of access points (APs) including mesh access points (MAPs) and one or more root APs (RAPs) that are collectively assigned to different AP groups, each RAP having a wired connection to the controller and configured to form a root of a tree in which the MAPs of a given group are linked back to the RAP of that group through parent-child connections over wireless backhaul channels: for each group, creating a distinct subset channel list that identifies backhaul channels used by RAPs of the group that are connected to the controller; for each group, updating the subset channel list as RAPs assigned to the group connect with and disconnect from the controller; and for each group, sending the subset channel list to the MAPs assigned to the group that are connected with the controller through respective RAPs when the subset channel list is created and updated.

In another form, an apparatus is provided comprising: a network interface unit configured to communicate with access points (APs) including mesh access points (MAPs) and one or more root APs (RAPs) of a mesh network that are collectively assigned to different AP groups, each RAP having a wired connection to the controller and configured to form a root of a tree in which the MAPs of a given group are linked back to the RAP of that group through parent-child connections over wireless backhaul channels; a processor coupled to the network interface unit, and configured to: for each group, create a distinct subset channel list that identifies backhaul channels used by RAPs of the group that are connected to the controller; for each group, update the subset channel list as RAPs assigned to the group connect with and disconnect from the controller; and for each group, send the subset channel list to the MAPs assigned to the group that are connected with the controller through respective RAPs when the subset channel list is created and updated.

In yet another form, a system is provided comprising: a controller; a plurality of access points (APs) of a mesh network configured to be connected to and controlled by the controller, the APs including mesh access points (MAPs) and one or more root APs (RAPs) that are collectively assigned to different AP groups, each RAP having a wired connection to the controller and configured to form a root of a tree in which the MAPs of a given group are linked back to the RAP of that group through parent-child connections over wireless backhaul channels; wherein the controller is configured to: for each group, create a distinct subset channel list that identifies backhaul channels used by RAPs of the group that are connected to the controller; for each group, update the subset channel list as RAPs assigned to the group connect with and disconnect from the controller; and for each group, send the created and updated subset channel list to the MAPs assigned to the group that are connected with the controller through respective RAPs; and wherein each MAP assigned to a given group is configured to: initially connect with the controller through a wireless backhaul channel connection to an initial parent AP; receive the subset channel list for the given group from the controller through the initial parent AP; if the MAP loses the backhaul channel connection to the initial parent AP, search the backhaul channels on the subset channel list for a new parent AP, instead of performing a search of all regulatory domain backhaul channels; and connect with a found parent AP based on results of the searching the subset channel list.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a controller of a mesh network of access points (APs) including mesh access points (MAPs) and one or more root APs (RAPs) that are collectively assigned to different AP groups, each RAP having a wired connection to the controller and configured to form a root of a tree in which the MAPs of a given group are linked back to the RAP of that group through parent-child connections over wireless backhaul channels:
for each group, creating a distinct subset channel list that identifies a subset of a full set of regulatory domain backhaul channels assigned to or actually used by RAPs of the group that are connected to the controller;
for each group, updating the subset channel list as RAPs assigned to the group connect with and disconnect from the controller; and
for each group, sending the subset channel list to the MAPs assigned to the group that are connected with the controller through respective RAPs when the subset channel list is created and updated, and that roam between parent APs in the group,
wherein the respective subset channel list that is sent to each MAP in each group identifies the only backhaul channels to be searched by the MAP, instead of the full set of regulatory domain backhaul channels, for a respective new parent AP in the group if the respective MAP loses a backhaul connection to an initial parent AP in the group.

2. The method of claim 1, wherein the updating includes:
for each group, adding and removing backhaul channels to and from the subset channel list when RAPs assigned to that group (i) connect to and disconnect from the controller, respectively, or (ii) switch from current backhaul channels to new backhaul channels.

3. The method of claim 1, further comprising:
detecting if a MAP has roamed from a first parent AP to a second parent AP within a given group; and
if it is detected that the MAP has roamed, sending the subset channel list for the group to the MAP through the second parent AP.

4. The method of claim 1, wherein:
each group of MAPs and RAPs is divided among multiple geographical regions;
for each region of each group, the creating includes creating a distinct subset channel list, thereby creating multiple subset channel lists for each group, one per region; and
the sending includes sending the subset channel list for each region to the MAPs for that region that are connected with the controller through the respective RAPs.

5. The method of claim 4, further comprising:
estimating a coverage area associated with a given region of a given group based on a location of one or more RAPs and MAPs in the given region,
wherein, when a new MAP joins the mesh network within the given region, the sending includes sending the subset channel list for the given region to the new MAP.

6. The method of claim 1, further comprising, at the controller:
storing information that identifies (i) the RAP and MAPs assigned to each group, and (ii) pre-assigned backhaul channels to be used by each RAP; and
accessing the stored information each time a RAP becomes connected with the controller,
wherein the creating and updating each include populating the subset channel lists with the pre-assigned backhaul channels identified in the accessed information based on the RAPs connected with the controller.

7. The method of claim 1, further comprising, at each MAP assigned to a given group:
initially connecting with the controller through a wireless backhaul channel connection to an initial parent AP;
receiving the subset channel list for the given group from the controller through the initial parent AP;
if the MAP loses the backhaul channel connection to the initial parent AP, searching the backhaul channels on the subset channel list for a new parent AP, instead of searching all regulatory domain backhaul channels; and
connecting with a found parent AP based on results of the searching the subset channel list.

8. The method of claim 7, further comprising, at the MAP assigned to the given group:
prior to initially connecting with the controller, searching all of the regulatory domain backhaul channels for a parent AP,
wherein the initially connecting includes initially connecting with the controller through the initial parent AP based on results of the searching all of the regulatory domain backhaul channels.

9. The method of claim 8, wherein:
the searching all of the regulatory domain backhaul channels for a parent AP includes:
passively scanning all of the regulatory domain backhaul channels to identify neighbor AP channels; and actively scanning neighbor channels identified as a result of the passively scanning; and the searching the backhaul channels on the subset channel list for a new parent AP includes only actively scanning the backhaul channels on the subset channel list to identify neighbor AP channels.

10. The method of claim 7, further comprising, at the MAP assigned to the given group:

searching all of the regulatory domain backhaul channels responsive to a boot-up procedure of the MAP; and storing the received subset channel list in non-volatile memory, which is cleared each time the MAP performs the boot-up procedure.

11. The method of claim 7, further comprising, at the MAP assigned to the given group:

establishing an Internet Protocol (IP) tunnel with the controller over the backhaul channel connection with the initial parent AP;

maintaining state information related to the IP tunnel, including an IP address assigned to the MAP, when the backhaul channel connection is lost and during the searching the subset channel list; and after the connecting with the found parent, re-establishing the IP tunnel with the controller based on the maintained state information and the IP address.

12. The method of claim 1, wherein the subset channel list is a subset of predetermined regulatory domain backhaul channels.

13. An apparatus comprising:

a hardware network interface unit to communicate with access points (APs) including mesh access points (MAPs) and one or more root APs (RAPs) of a mesh network that are collectively assigned to different AP groups, each RAP having a wired connection to the controller and configured to form a root of a tree in which the MAPs of a given group are linked back to the RAP of that group through parent-child connections over wireless backhaul channels;

a processor coupled to the network interface unit, to:

for each group, create a distinct subset channel list that identifies a subset of a full set of regulatory domain backhaul channels assigned to or actually used by RAPs of the group that are connected to the controller;

for each group, update the subset channel list as RAPs assigned to the group connect with and disconnect from the controller; and for each group, send the subset channel list to the MAPs assigned to the group that are connected with the controller through respective RAPs when the subset channel list is created and updated, and that roam between parent APs in the group, wherein the respective subset channel list that is sent to each MAP in each group identifies the only backhaul channels to be searched by the MAP, instead of the full set of regulatory domain backhaul channels, for a respective new parent AP in the group if the respective MAP loses a backhaul connection to an initial parent AP in the group.

14. The apparatus of claim 13, wherein the processor updates by: for each group, adding and removing backhaul channels to and from the subset channel list when RAPs assigned to that group (i) connect to and disconnect from the controller, respectively, or (ii) switch from current backhaul channels to new backhaul channels.

15. The apparatus of claim 13, wherein the processor:

detects if a MAP has roamed from a first parent AP to a second parent AP within a given group; and if it is detected that the MAP has roamed, sends the subset channel list for the group to the MAP through the second parent AP.

16. The apparatus of claim 13, wherein:

each group of MAPs and RAPs is divided among multiple geographical regions;

for each region of each group, the processor creates a distinct subset channel list, thereby creating multiple subset channel lists for each group, one per region; and the processor sends the subset channel list for each region to the MAPs for that region that are connected with the controller through the respective RAPs.

17. The apparatus of claim 13, wherein the processor:

stores information that identifies (i) the RAPs and MAPs assigned to each group, and (ii) pre-assigned backhaul channels to be used by each RAP; and accesses the stored information each time a RAP becomes connected with the controller, creates and updates by populating the subset channel lists with the pre-assigned backhaul channels identified in the accessed information based on the RAPs connected with the controller.

18. The apparatus of claim 13, wherein the subset channel list is a subset of predetermined regulatory domain backhaul channels.

19. A system comprising:

a controller implemented on a hardware platform;

a plurality of access points (APs) of a mesh network configured to be connected to and controlled by the controller, the APs including mesh access points (MAPs) and one or more root APs (RAPs) that are collectively assigned to different AP groups, each RAP having a wired connection to the controller and configured to form a root of a tree in which the MAPs of a given group are linked back to the RAP of that group through parent-child connections over wireless backhaul channels;

wherein the controller:

for each group, creates a distinct subset channel list that identifies a subset of a full set of regulatory domain backhaul channels used by RAPs of the group that are connected to the controller;

for each group, updates the subset channel list as RAPs assigned to the group connect with and disconnect from the controller; and for each group, sends the created and updated subset channel list to the MAPs assigned to the group that are connected with the controller through respective RAPs, and that roam between parent APs in the group; and wherein each MAP assigned to a given group is configured to:

initially connects with the controller through a wireless backhaul channel connection to an initial parent AP;

receives the subset channel list for the given group from the controller through the initial parent AP;

if the MAP loses the backhaul channel connection to the initial parent AP, searches only the backhaul channels on the subset channel list for a new parent AP, instead of performing a search of all regulatory domain backhaul channels; and connects with a found parent AP based on results of the searching the subset channel list.

20. The system of claim 19, wherein the MAP assigned to the given group:
- prior to initially connecting with the controller, searches all of the regulatory domain backhaul channels in search of a parent AP;
- initially connects with the controller through the initial parent AP based on results of the searching of all of the regulatory domain backhaul channels.

21. The system of claim 20, wherein the MAP assigned to the given group:
- performs the operation to search all of the regulatory domain backhaul channels responsive to a boot-up procedure of the MAP; and
- stores the received subset channel list in non-volatile memory, which is cleared each time the MAP performs the boot-up procedure.

22. The system of claim 19, wherein the MAP assigned to the given group:
- establishes an Internet Protocol (IP) tunnel with the controller over the backhaul channel connection with the initial parent AP;
- maintains state information related to the IP tunnel, including an IP address assigned to the MAP, when the backhaul channel connection is lost and during the search of the subset channel list; and
- after the MAP is connected with the found parent, re-establishes the IP tunnel with the controller based on the maintained state information and the IP address.

* * * * *